United States Patent [19]
Muirhead et al.

[11] Patent Number: 5,913,159
[45] Date of Patent: Jun. 15, 1999

[54] ADAPTIVE PULSE DETECTOR UTILIZING DELAYED INPUT COMPARISON

[75] Inventors: James O. Muirhead, San Pedro; Gerald E. Held, Santa Ana, both of Calif.

[73] Assignee: Raytheon Company, Lexington, Mass.

[21] Appl. No.: 07/944,561

[22] Filed: Sep. 14, 1992

[51] Int. Cl.$^6$ .............................. H04B 17/00; G01S 3/02
[52] U.S. Cl. ...................... 455/226.4; 455/67.1; 342/465
[58] Field of Search ............................ 455/226.4, 226.1, 455/226.2, 226.3, 67.1, 67.6, 67.7, 303, 304, 305, 307, 132; 375/76, 94, 316, 340–2; 307/359; 342/465

[56] References Cited

U.S. PATENT DOCUMENTS

| | | | |
|---|---|---|---|
| 4,257,126 | 3/1981 | Theall, Jr. .............................. | 375/76 X |
| 4,803,701 | 2/1989 | Rhodes ................................. | 455/305 X |
| 5,134,721 | 7/1992 | Fujimoto ............................... | 455/303 X |
| 5,216,429 | 6/1993 | Nakagawa et al. ................... | 342/465 X |

*Primary Examiner*—Wellington Chin
*Assistant Examiner*—P. Sobutka
*Attorney, Agent, or Firm*—Leonard A. Alkov; William C. Schubert; Glenn H. Lenzen, Jr.

[57] ABSTRACT

An adaptive signal level detector. The inventive detector includes a first circuit for receiving an input signal and providing a second signal identical to said input signal and delayed relative thereto. The amplitude of the delayed signal is compared to the maximum amplitude of the input signal. When the second signal is at a predetermined level relative to the input signal an output signal is provided. In a specific implementation, the invention (10) includes a first circuit (18) for detecting the signal level of the transmitted signal and providing a second signal in response thereto. The second signal is a logarithmic representation of the input signal The second signal is delayed (20) to provide a third signal. The third signal is subtracted (24) from the second signal to provide a fourth signal. When the fourth signal exceeds a predetermined threshold, an output signal is provided. The invention provides a threshold detection circuit that will detect the instant when the amplitude of the leading or trailing edge of a received pulse crosses a threshold which is a predetermined fraction of the peak pulse amplitude of the received signal independent of the amplitude thereof. The invention enables several different receivers at separate locations to detect the same point on a received pulse signal independently of variations in antenna gain, receiver gain or received signal strength. Because the invention provides measurement independent of pulse amplitude, highly accurate matching of receivers is no longer required. The inventive circuit will greatly enhance the accuracy of comparison of the time of arrival of an transmitted signal at separate receivers.

23 Claims, 3 Drawing Sheets

ADAPTIVE PULSE DETECTOR UTILIZING DELAYED INPUT COMPARISON

BACKGROUND OF THE INVENTION

1. Field of the Invention

The present invention relates to communication systems. More specifically, the present invention relates to receivers with signal processors for determining the location of a transmitter and the time of arrival of a pulse therefrom.

While the present invention is described herein with reference to illustrative embodiments for particular applications, it should be understood that the invention is not limited thereto Those having ordinary skill in the art and access to the teachings provided herein will recognize additional modifications, applications, and embodiments within the scope thereof and additional fields in which the present invention would be of significant utility

2. Description of the Related Art

In many applications, there is a need to determine the time and angle of arrival of a transmitted pulse. For example, in military applications, the conventional technique for determining the ability of a gunner to hit a target with a munition is visual. That is, the target is simply visually examined to determine the number of hits or score.

Unfortunately, the visual scoring method is costly due to the requirement that the target be retrieved and examined to provide a score. Visual scoring from a remote location is often complicated by numerous range and/or battlefield conditions including darkness, haze, smoke, dust, and etc. In addition, there is no real time feedback of a gunners score during the firing operation. Accordingly, the opportunity for real time correction is not provided with conventional scoring techniques U.S. patent application entitled RADIO FREQUENCY DEVICE FOR MARKING MUNITION IMPACT POINT, U.S. Pat. No. 5,280,751, by J. O. Muirhead and G. E. Held discloses a unique and advantageous automatic system for gunnery scoring The system includes a plurality of miniature radio transmitters which are mounted on one or more of the munitions. The transmitters are energized when the projectile impacts the target. The transmitted signal is detected by one or more receivers. Detection occurs when the received signal exceeds a fixed threshold. By accurately monitoring the time of arrival at a number of different locations, the angle of arrival may be determined at each receiver from which the impact point of the round can be determined by triangulation.

Unfortunately, due to attenuation, the amplitude of the signal transmitted from the impact point varies inversely with the square of the distance from the impact point to the receiver. Thus, each receiver may receive the transmitted signal at a different level. With each receiver having a detector with the same fixed threshold, differences in signal levels translate to differences in the time of detection of the transmitted signal. Differences in the time of detection, contribute to error in the location computations Other sources of error include differences in antenna and receiver gain patterns.

Thus, there is a need in the art for further improvements in gunnery scoring systems utilizing munitions equipped with radio transmitters. More specifically, there is a need in the art for a technique for minimizing computation error due to signal level variations at the receivers of gunnery scoring systems using munitions equipped with radio transmitters.

SUMMARY OF THE INVENTION

The need in the art is addressed by the present invention which provides an adaptive signal level detector. The inventive detector includes a first circuit for receiving an input signal and providing a second signal identical to said input signal and delayed relative thereto. The amplitude of the delayed signal is compared to the maximum amplitude of the input signal. When the second signal is at a predetermined level relative to the input signal an output signal is provided.

In a specific implementation, the invention includes a first circuit for detecting the signal level of the transmitted signal and providing a second signal in response thereto. The second signal is a logarithmic representation of the input signal. The second signal is delayed to provide a third signal. The third signal is subtracted from the second signal to provide a fourth signal. When the fourth signal exceeds a predetermined threshold, an output signal is provided.

The invention provides a threshold detection circuit that will detect the instant when the amplitude of the leading or trailing edge of a received pulse crosses a threshold which is a predetermined fraction of the peak pulse amplitude of the received signal independent of the amplitude thereof. The system is adaptive to pulses of different amplitudes by the use of logarithmic pulse amplification prior to subtraction of a delayed version of the pulse from the undelayed pulse. When the delayed pulse is delayed by an amount equal to or greater than the expected rise time of the pulses, the output is the instantaneous difference between the logarithms which is the logarithm of the instantaneous amplitude ratios of the delayed to the undelayed pulse. This may be achieved with the leading or the trailing edges or both. The log ratio video voltage is compared to a preset value (e.g., decibels).

The invention enables several different receivers at separate locations to detect the same point on a received pulse signal independently of variations in antenna gain, receiver gain or received signal strength. Because the invention provides measurement independent of pulse amplitude, highly accurate matching of receivers is no longer required. The inventive circuit will greatly enhance the accuracy of comparison of the time of arrival of a transmitted signal at separate receivers.

BRIEF DESCRIPTION OF THE DRAWINGS

FIG. 5 is an illustrative implementation of the time measurement circuit utilized in the pulse width measuring system utilizing the teachings of the present invention.

DESCRIPTION OF THE INVENTION

Illustrative embodiments and exemplary applications will now be described with reference to the accompanying drawings to disclose the advantageous teachings of the present invention.

Figure 1:
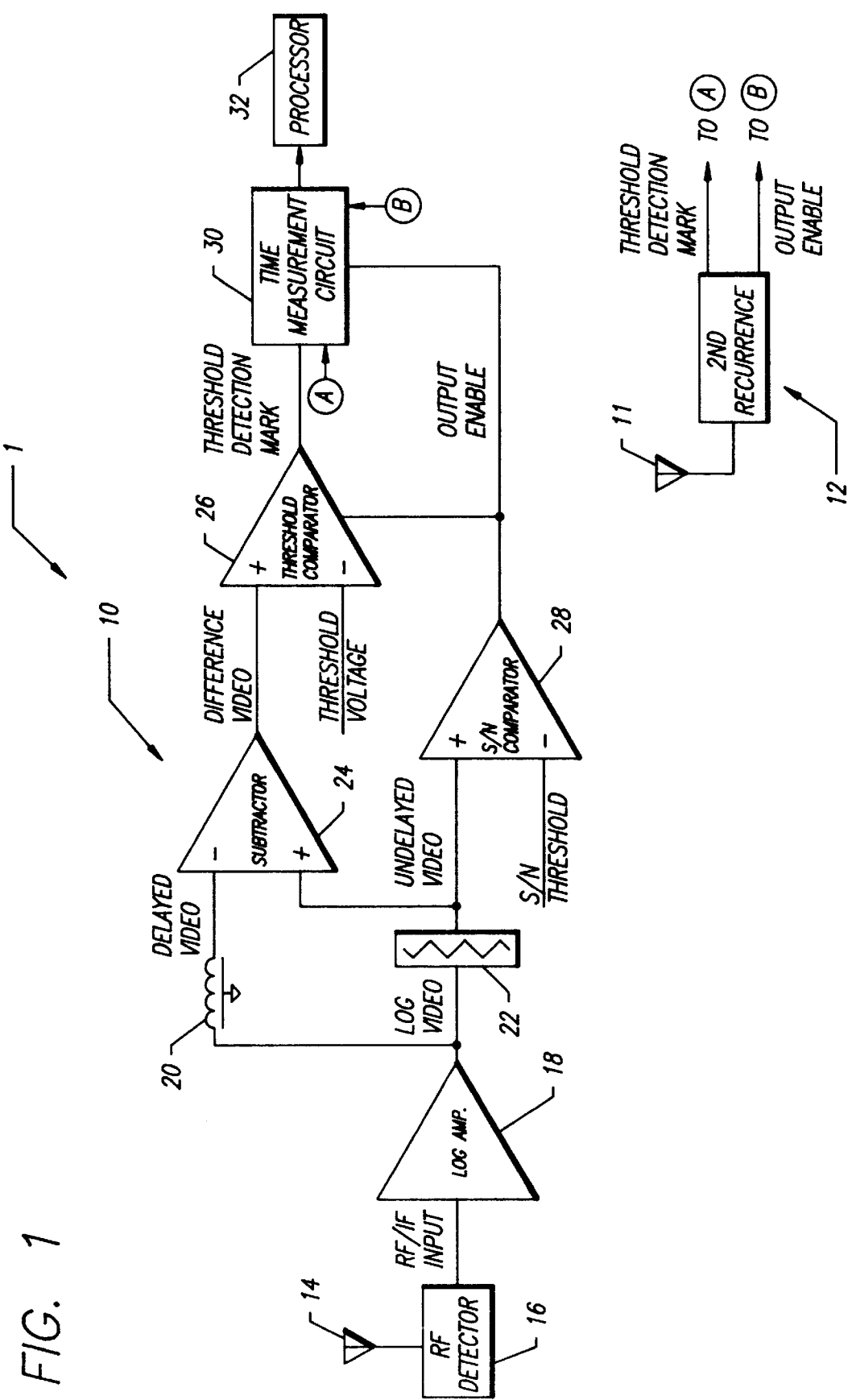
FIG. 1 is a schematic diagram of an illustrative implementation of a system incorporating the adaptive signal level detector of the present invention.

FIG. 1 is a schematic diagram of an illustrative implementation of a system incorporating the adaptive signal level detector of the present invention. The system 1 includes a first receiver 10 and an identical second receiver 12. The first receiver 10 is shown in detail and includes an antenna 14 and a conventional radio frequency (RF) detector 16. In the alternative, the RF detector 16 may be replaced with an intermediate frequency (IF) detector. The RF detector 16 receives a signal in the form of a pulse from a source such as an RF munition such as that disclosed in the above-mentioned U.S. patent application entitled RADIO FREQUENCY DEVICE FOR MARKING MUNITION IMPACT POINT, U.S. Pat. No. 5,280,751, by J. O. Muirhead and G. E. Held.

The received signal is input to a logarithmic amplifier (log amp) 18. The log amp 18 converts the input RF signal to a voltage proportional to the logarithm of the instantaneous amplitude of the input signal. A typical transfer function for a log amp is 25 millivolts per decibel of input power over the dynamic range of the log amp. Dynamic ranges of log amps vary from a low end of –80 to –60 dBm (decibels relative to 1 milliwatt) to a high end of 0 dBm. The selection of log amp characteristics will depend on the application and need only be known to permit proper set up of the threshold voltage and S/N threshold reference voltages.

The output of the logarithmic amplifier 18 is split in two paths, one with a delay element 20. In the illustrative embodiment, the delay element is an inductor. However, depending on the frequency of the received signal, a transmission line of a predetermined length may be used to delay the signal in the first path in a manner well known to those skilled in the art.

The delay line must provide sufficient delay to ensure that the pulse under measurement (log video) has time to rise to peak amplitude before the delayed video has risen to within the desired detection threshold. The amount of delay required is dependent upon the rise time of the pulses expected.

As the delay element will attenuate the signal in the first path, an attenuator 22 is included in the second path to ensure that the insertion losses in the two paths are equal. This assures that both the delayed and undelayed inputs to the subtractor 24 have the same transfer function in terms of volts per decibel. The attenuator may be a resistor or other suitable element.

A subtractor 24 subtracts the delayed signal from the undelayed signal output by the logarithmic amplifier 18. The subtractor output is the voltage difference between the undelayed video signal and the delayed video signal and is referred to herein as the "difference video". The difference video is the logarithm of the instantaneous ratio of the delayed video to the undelayed video. It may be considered to be scaled in terms of volts per decibel.

The-output of the subtractor 24 is thresholded by a first comparator; a threshold comparator 26. The threshold comparator compares the instantaneous log ratio to the input threshold setting (threshold voltage). When the difference video falls below the threshold voltage, the threshold comparator outputs a threshold detection mark if the output is enabled. The threshold voltage may be preset or adjustable. The value of the threshold voltage is dependent on the desired pulse power detection level relative to the peak pulse power and the volts per decibel of the difference video.

The threshold comparator 26 is enabled by the output of a second comparator, a signal-to-noise (S/N) comparator 28. The S/N comparator prevents the circuit from triggering on noise in the absence of input pulses. The S/N comparator 28 compares the undelayed output of the logarithmic amplifier to a noise threshold to provide enable signals for the first comparator 26 and a conventional time measurement circuit 30. When an undelayed video pulse rises above the S/N threshold voltages the S/N comparator 28 will change output levels thereby enabling the threshold comparator. The output enable from the S/N comparator 28 may also be provided to external logic. The setting of the S/N threshold will determine the false alarm rate caused by noise.

Figure 2:
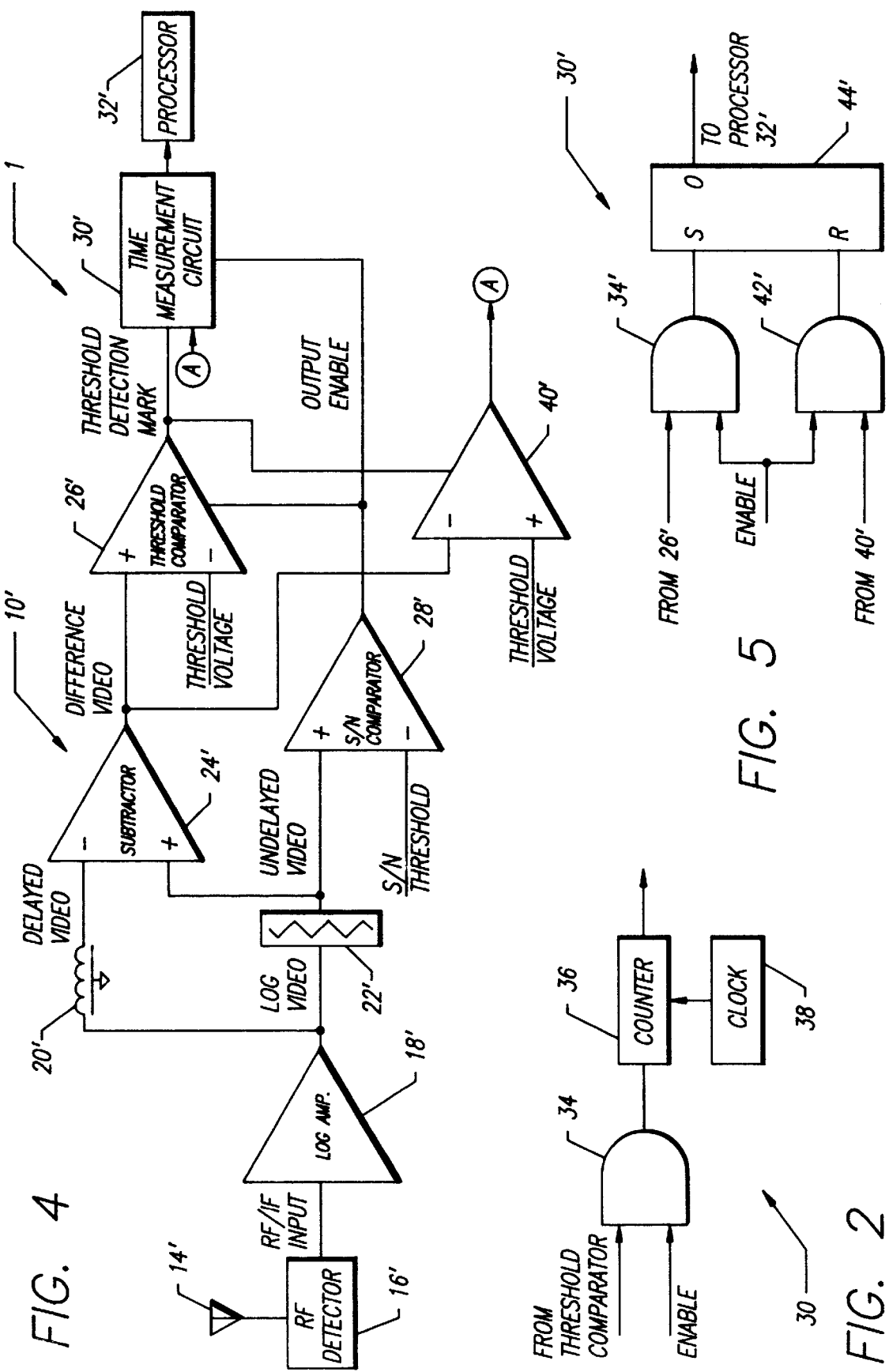
FIG. 2 is an illustrative implementation of the time measurement circuit utilized in the adaptive signal level detector of the present invention.

A time measurement circuit 30 computes the time of arrival of the pulse based on an internal reference clock. FIG. 2 is an illustrative implementation of the time measurement circuit 30. The illustrative time measurement circuit 30 includes an AND gate 34 which receives the output from the threshold comparator 26 and the enable output signal from the S/N comparator 28. The AND gate output enables a counter 36 which counts pulses from a clock 38 to provide the indication of the time of arrival of the pulse from a transmitter.

A similar circuit (not shown) would compute the time of arrival of the signal as received by the second receiver 12 from a second antenna element 11.

The output of the time measurement circuit is provided to a processor 32 which computes angle of arrival information based on the time measurement signal and the distance between the receivers.

Figure 3:
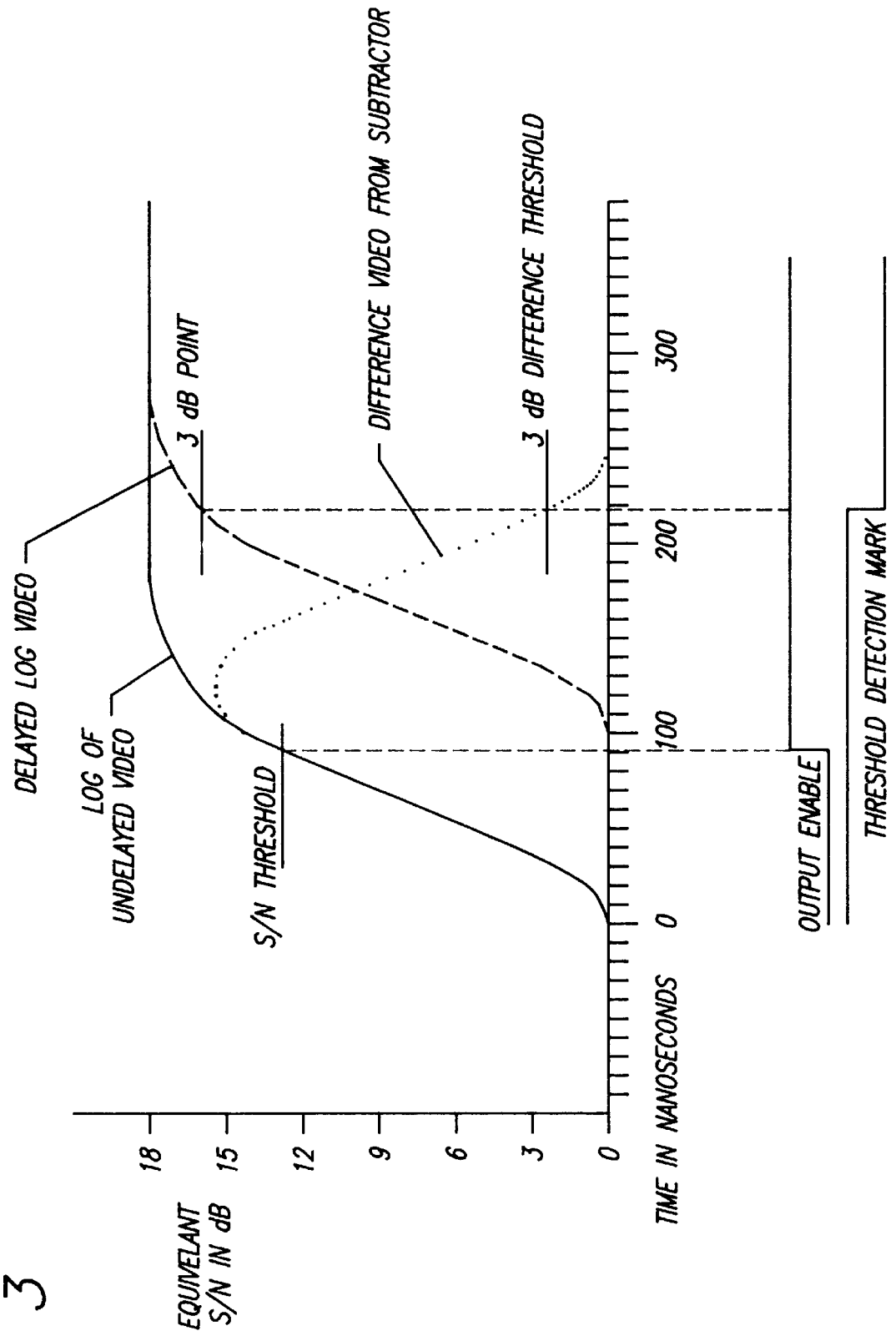
FIG. 3 is a graph of the equivalent signal-to-noise ratio of the undelayed and delayed video signal in the adaptive signal level detector of the present invention with the output enable and threshold detection mark signals-shown in relation to the time line thereof FIG. 4, for example, is a schematic diagram of a pulse width measuring system utilizing the teachings of the present invention.

FIG. 3 is a graph of the equivalent signal-to-noise ratio of the undelayed and delayed video signal in the adaptive signal level detector of the present invention with an exemplary delay of 100 nanoseconds. The output enable and threshold detection mark signals are shown in relation to the time line of the graph. Note that as the energy density of the received RF signal rises, the log of the undelayed signal rises to a peak S/N ratio of 18 dB. With a delay of 100 nanoseconds set by the delay element 20, the log of the delayed video signal begins to rise at the 100 nanosecond mark. Note that with a S/N threshold of 12 dB set by the S/N comparator 28, an output enable signal is provided at 100 nanoseconds. As the delayed video signal rises, the difference video signal begins to peak and then fall off as shown. When the difference video signal from the subtractor 24 falls below the threshold set by the threshold comparator 26, that is, 3 dB, the threshold detector outputs the threshold detector mark signal, shown as a high to low transition. It may now be appreciated that the threshold set by the threshold comparator 26 is the threshold for the log of the delayed video signal. That is, setting a 3 dB threshold, for example, at the threshold comparator 26 is tantamount to setting a point at which the delayed video signal is 3 dB down from its maximum value. More importantly, as the difference between the logarithm of two values is the log of the ratio of the two values, it can be seen that the present invention provides a system for determining when a delayed signal has reached a predetermined proportion of a maximum value. As the amount of the delay is known, the present invention allows for a determination of the time at which the undelayed signal reaches the predetermined proportion of its maximum value independent of the amplitude thereof.

Thus, the present invention has been described herein with reference to a particular embodiment for a particular application. Those having ordinary skill in the art and access to the present teachings will recognize additional modifications applications and embodiments within the scope thereof. For example, the invention is not limited to the illustrative application. The invention may be used for numerous other applications as well. FIG. 4, for example, is a schematic diagram of a pulse width measuring system utilizing the teachings of the present invention. The circuit of FIG. 4 is identical to that of FIG. 2 with the exception that an additional threshold comparator 40' is added and the time measurement circuit is implemented differently as shown in FIG. 5. The second threshold comparator 40' detects the trailing edge and provides a reset signal to a set-reset flip-flop 44' of FIG. 5 through a second AND gate 42'. The flip-flop 44' is set by the output of the first AND gate which is fed by the output of the first threshold comparator 26'. The counter number must be added to 2 times the delay line delay in the same units to obtain the total pulse width.

It is therefore intended by the appended claims to cover any and all such applications, modifications and embodiments within the scope of the present invention.

Accordingly,
What is claimed is:

1. A pulse signal level detector for detection of non-periodic RF pulses, comprising:
   RF detection means for detecting the RF pulse and providing an RF detector signal;
   first means for receiving said RF detector signal and providing a second signal identical to said RF detector signal and delayed relative thereto; and
   second means for comparing the amplitude of said delayed signal to the maximum amplitude of said RF detector signal and providing a comparison signal indicating the presence or absence of said RF pulse.

2. A pulse detector for detection of non-periodic RF pulses, comprising:
   RF detection means for detecting said RF pulse and providing an RF detector signal;
   first means responsive to said RF detector signal for providing a second signal identical to said RF detector signal and delayed relative thereto; and
   second means for determining when said second signal is at a predetermined level relative to the maximum level of said RF detector signal and providing an output signal in response thereto.

3. An adaptive pulse detector comprising:
   first means for detecting the signal level of an input pulse signal and providing a second signal in response thereto, said second signal being a logarithmic representation of said input pulse signal;
   second means for delaying said second signal and providing a third signal;
   third means for subtracting said third signal from said second signal to provide a fourth signal whose value is independent of the amplitude of the input signal pulse over a range of operation;
   fourth means for comparing said fourth signal to a first threshold representing a fraction of peak amplitude of the input pulse signal at which detection is desired independent of the input signal peak amplitude, to provide a pulse detector output signal; and
   wherein said second means provides sufficient delay to permit said second signal to rise to peak amplitude before said third signal has risen to said first threshold.

4. The invention of claim 3 wherein said first means includes a logarithmic amplifier.

5. The invention of claim 4 wherein said third means is a subtractor having positive and negative input terminals, said third signal being provided from said logarithmic amplifier to said subtractor via a first path and said second signal being provided from said logarithmic amplifier to said subtractor via a second path.

6. The invention of claim 5 wherein said second means includes an inductor disposed in said first path.

7. The invention of claim 6 including means disposed in said second path for providing attenuation in said second path which is substantially equal to the attenuation in said first path.

8. The invention of claim 5 wherein said second means includes a transmission line of a predetermined length disposed in said second path.

9. A system for detecting the location of a source of a transmitted pulse signal comprising:
   first and second receivers, each receiver having a pulse detector, said pulse detector comprising:
      first means for detecting the signal level of an input signal and providing a second signal in response thereto, said second signal being a logarithmic representation of said input signal;
      second means for delaying said second signal and providing a third signal;
      third means for subtracting said third signal from said second signal to provide a fourth signal;
      fourth means for comparing said fourth signal to a first threshold to provide a detector output signal; and
      wherein said delay line provides sufficient delay to permit said second signal to rise to peak amplitude before said third signal has risen to said first threshold;
   time measurement means responsive to a detector output signal from each of said first and second receivers for computing the time of arrival of said transmitted signal at each of said receivers; and
   processor means for providing an indication of the location of said source based on said computed time of arrival.

10. The invention of claim 9 wherein said first means includes a logarithmic amplifier.

11. The invention of claim 10 wherein said second means is a subtractor having positive and negative input terminals, said third signal being provided from said logarithmic amplifier to said subtractor via a first path and said second signal being provided from said logarithmic amplifier to said subtractor via a second path.

12. The invention of claim 11 wherein said second means includes an inductor disposed in said first path.

13. The invention of claim 12 including means disposed in said second path for providing attenuation in said second path which is substantially equal to the attenuation in said first path.

14. The invention of claim 11 wherein said second means includes a transmission line of a predetermined length disposed in said second path.

15. A pulse width measurement circuit comprising:
   a first adaptive pulse detector for detecting the leading edge of a pulse and providing a first signal in response thereto and
   a second adaptive pulse detector for detecting the trailing edge of said pulse and providing a second signal in response thereto,
   said pulse detectors comprising:
      first means for detecting the signal level of said pulse and providing a second signal in response thereto, said second pulse being logarithmic representation of said pulse;
      second means for delaying said second signal and providing a third signal;

third means for subtracting said third signal from said second signal to provide a fourth signal;

fourth means for comparing said fourth signal to a first threshold to provide said first and said second signal; and wherein said delaying means provides sufficient delay to permit said second signal to rise to peak amplitude before said third signal has risen to said first threshold; and time measurement means for determining the width of said pulse based on said first and second signals.

16. A method for detecting the level of a transmitted non-periodic RF pulse signal, including the steps of:

detecting the RF pulse and providing an RF detector signal;

responding to the RF detector signal and providing a second signal identical to said RF detector signal and delayed relative thereto; and comparing the amplitude of said delayed signal to the maximum amplitude of said RF detector signal and providing a comparison signal indicating the presence or absence of said RF pulse.

17. A method for detecting the level of transmitted non-periodic RF pulses, including the steps of:

detecting the RF pulse and providing an RF detector signal;

responding to the RF detector signal and providing a second signal identical to said RF detector signal and delayed relative thereto; and determining when said second signal is at a predetermined level relative to the maximum level of said RF detector signal and providing an output signal in response thereto.

18. An adaptive method for detecting a transmitted pulse signal including the steps of:

detecting the signal level of an input pulse signal and providing a second signal in response thereto, said second signal being a logarithmic representation of said input pulse signal;

delaying said second signal and providing a third signal;

subtracting said third signal from said second signal to provide a fourth signal whose value is independent of the amplitude of the input pulse signal over a range of operation;

comparing said fourth signal to a first threshold representing a fraction of peak amplitude of the input pulse signal at which detection is desired independent of the magnitude of the input pulse signal, to provide a pulse detector output; and wherein said delaying of said second signal is sufficient to permit said second signal to rise to peak amplitude before said third signal has risen to said first threshold.

19. A method for detecting the location of a source of a transmitted pulse signal including the steps of:

receiving said transmitted pulse signal with first and second receivers, each receiver having a pulse detector, said pulse detector comprising:

detecting the signal level of an input signal and providing a second signal in response thereto, said second signal being a logarithmic representation of said input signal;

delaying said second signal and providing a third signal;

subtracting said third signal from said second signal to provide a fourth signal; and comparing said fourth signal to a first threshold to provide a detector output;

wherein said delaying step provides a delay which is sufficient to permit said second signal to rise to peak amplitude before said third signal has risen to said first threshold;

computing the time of arrival of said transmitted signal at each of said receivers; and providing an indication of the location of said source based on said computed time of arrival.

20. An adaptive pulse detector comprising:

first means for detecting the signal level of an input pulse signal and providing a second signal in response thereto, said first means comprising a logarithmic amplifier, said second signal being a logarithmic representation of said input pulse signal;

second means for delaying said second signal and providing a third signal;

third means for subtracting said third signal from said second signal to provide a fourth signal, said third means comprising a subtractor having positive and negative input terminals, said third signal being provided from said logarithmic amplifier to said subtractor via a first path and said second signal being provided from said logarithmic amplifier to said subtractor via a second path;

fourth means for comparing said fourth signal to a first threshold to provide a pulse detector output signal;

means for comparing the signal level in said second path to a predetermined threshold to provide an output enable signal in response thereto; and wherein said delay line provides sufficient delay to permit said second signal to rise to peak amplitude before said third signal has risen to said first threshold.

21. The invention of claim 20 wherein said fourth means includes a first comparator which is enabled by said enable signal.

22. A system for detecting the location of a source of a transmitted pulse signal comprising:

first and second receivers, each receiver having a pulse detector, said pulse detector comprising:

first means for detecting the signal level of an input signal and providing a second signal in response thereto, said first means including a logarithmic amplifier, said second signal being a logarithmic representation of said input signal;

second means for delaying said second signal and providing a third signal, said second means comprising a subtractor having positive and negative input terminals, said third signal being provided from said logarithmic amplifier to said subtractor via a first path and said second signal being provided from said logarithmic amplifier to said subtractor via a second path;

means for comparing the signal level in said second path to a predetermined threshold to provide an output enable signal in response thereto;

third means for subtracting said third signal from said second signal to provide a fourth signal;

fourth means for comparing said fourth signal to a first threshold to provide a detector output signal; and wherein said delay line provides sufficient delay to permit said second signal to rise to peak amplitude before said third signal has risen to said first threshold;

time measurement means responsive to a detector output signal from each of said first and second receivers for computing the time of arrival of said transmitted signal at each of said receivers; and processor means for providing an indication of the location of said source based on said computed time of arrival.

23. The invention of claim 22 wherein said fourth means includes a first comparator which is enabled by said enable signal.

* * * * *